Figure 1:
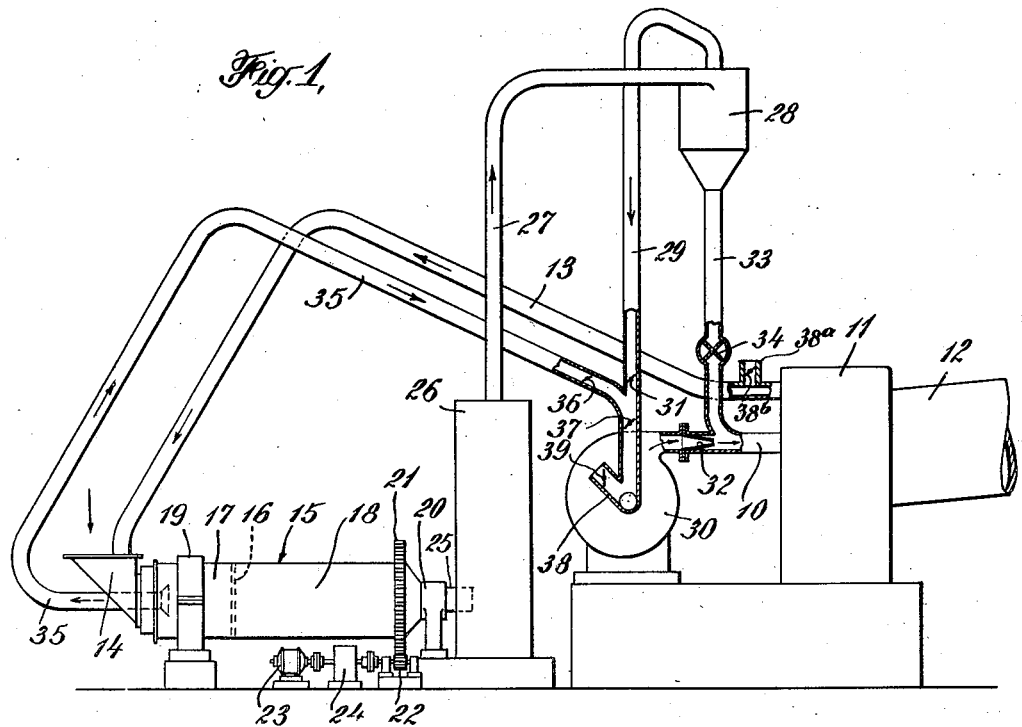

Oct. 21, 1941.  M. VOGEL-JORGENSEN  2,259,967

FUEL SUPPLY SYSTEM

Filed March 1, 1939  2 Sheets-Sheet 1

INVENTOR
Michael Vogel-Jorgensen
BY
Pennie Davis Marvin Edmonds
ATTORNEYS

Oct. 21, 1941.   M. VOGEL-JORGENSEN   2,259,967
FUEL SUPPLY SYSTEM
Filed March 1, 1939   2 Sheets-Sheet 2

INVENTOR
Mikael Vogel-Jorgensen
BY
ATTORNEYS

Patented Oct. 21, 1941

2,259,967

UNITED STATES PATENT OFFICE 2,259,967

FUEL SUPPLY SYSTEM

Mikael Vogel-Jorgensen, Frederiksberg, near Copenhagen, Denmark, assignor to F. L. Smidth & Co., New York, N. Y., a corporation of New Jersey Application March 1, 1939, Serial No. 259,129

9 Claims. (Cl. 110—106)

This invention relates to the art of preparing fuel in pulverized condition and supplying it for combustion in a chamber, such as a rotary kiln, furnace, etc. More particularly, the invention is concerned with a novel system by which fuel may be dried, pulverized, and supplied in mixture with air to a burner, the system being so constructed that it is flexible in operation and the different operations may be performed under close control so that the system may function at high efficiency.

In prior systems for preparing pulverized fuel and supplying a mixture of the fuel with air to a burner, it has been the common practice to utilize preheated air withdrawn from the combustion chamber, such as the end bottom of a rotary kiln, as the medium for drying the fuel and the drying is done either in the mill in which the fuel is ground or in a separate drying chamber. In both cases, the air used for drying carries from the mill the fuel which has been reduced to the desired degree of fineness. In some of the prior systems, the fuel-laden air stream passes to a separator from which the air goes to the intake side of a fan connected to the burner and the separated fuel is discharged into a silo from which it is withdrawn as required and discharged into the path of the air stream to the burner. In such systems, the output of the drying and grinding equipment is not closely coordinated with the needs of the burner and usually the equipment has a considerably greater output than the burner requires so that the equipment is run intermittently to fill the silo and then lies idle until a new fuel supply is required. The operation of the drying and grinding apparatus, therefore, requires considerable attention and must be shut down and started from time to time.

In other systems, the drying and grinding equipment is connected directly to the fan which supplies the fuel-air mixture to the burner, and the equipment operates throughout the period that fuel is being burned. In such systems, however, the passage of the fuel dust through the fan may cause serious wear to the moving and other parts of the fan.

Systems of both of the types referred to have the disadvantage that they lack flexibility and cannot be closely controlled. This result follows from the use of the same air current as the drying medium, the means for discharging the fine material from the mill, and the primary air for the burner. Ordinarily, the relative quantities of air most desirable for these three purposes differ to a substantial extent, and may vary from time to time depending, for example, on variations in the fuel, as for instance, in moisture content. Since in such systems, there is no provision for controlling the relative amounts of air employed for the several purposes, the use of the correct amount of air for one purpose is ordinarily obtained only at a sacrifice in efficiency in its other uses.

The present invention is directed to the provision of a novel system for preparing pulverized fuel and supplying it to a burner in which preheated air from the combustion chamber is used for drying, for sweeping the mill, and as primary air for combustion, but the relative amounts of air employed for these purposes may be controlled so as to permit the use of the correct amount for each purpose. In the new system, preheated air in the full amount required for drying is drawn from the combustion chamber and passed through the drying chamber, after which a portion of the air stream is diverted to the fan while the remainder passes through the mill to carry off the finely divided product. If the nature of the fuel makes it undesirable to pass the fuel-air stream through the fan, the air stream from the mill is led to a separator, and the air taken therefrom is then combined with that which has by-passed the mill. The combined quantities, that is, the original amount of air, enter the intake side of the fan and are delivered to the burner and the separated fuel is introduced into the air stream issuing from the fan. If required, additional atmospheric air for combustion may be admitted at the intake side of the fan to provide the desired total amount of primary air. When passage of the fuel through the fan is unobjectionable, the fuel-laden air stream from the mill passes directly to the fan, and the air which has by-passed the mill, together with such additional atmospheric air as is necessary, enters the intake side of the fan with the fuel-air mixture.

In both types of the new system, control means are provided so that the total amount of air withdrawn from the combustion chamber may be controlled as well as the relative amounts used for drying purposes and as the means for carrying the finely ground material from the mill. Also, the quantity of atmospheric air to be introduced into the system can be controlled. The use of the several controls thus makes it possible to maintain the relative proportions of air used in the drying chamber and mill and to vary the total quantity of air supplied to the burner for primary air without altering these proportions. If a variation in the moisture content of the fuel occurs, the amount of preheated air used in the drying chamber may be varied as required to meet the new conditions, and this variation may be effected without change in the amount of air used for sweeping the mill.

Figure 2:
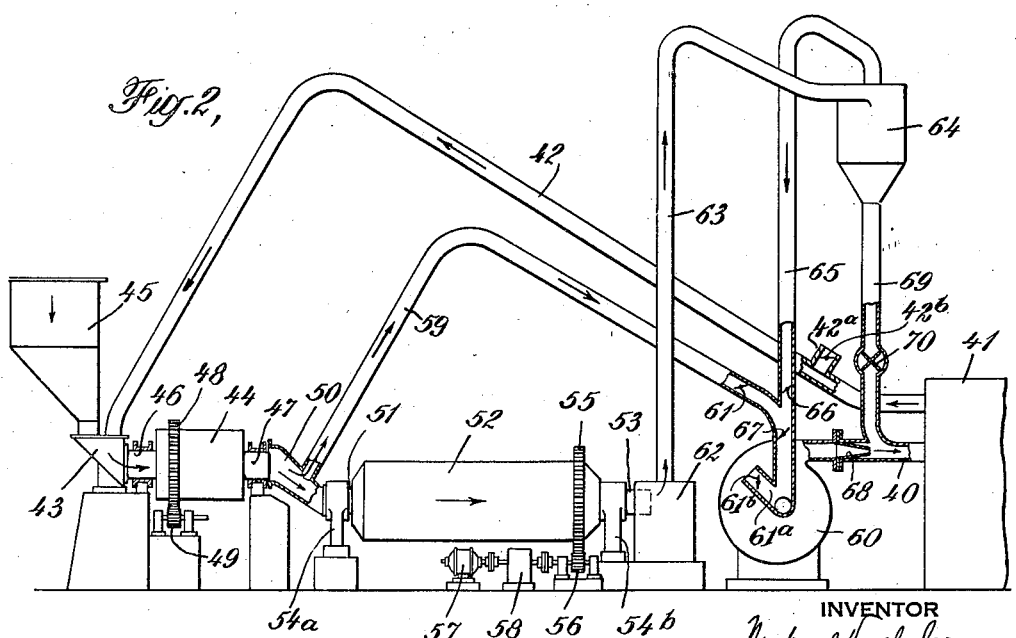
Figure 3:
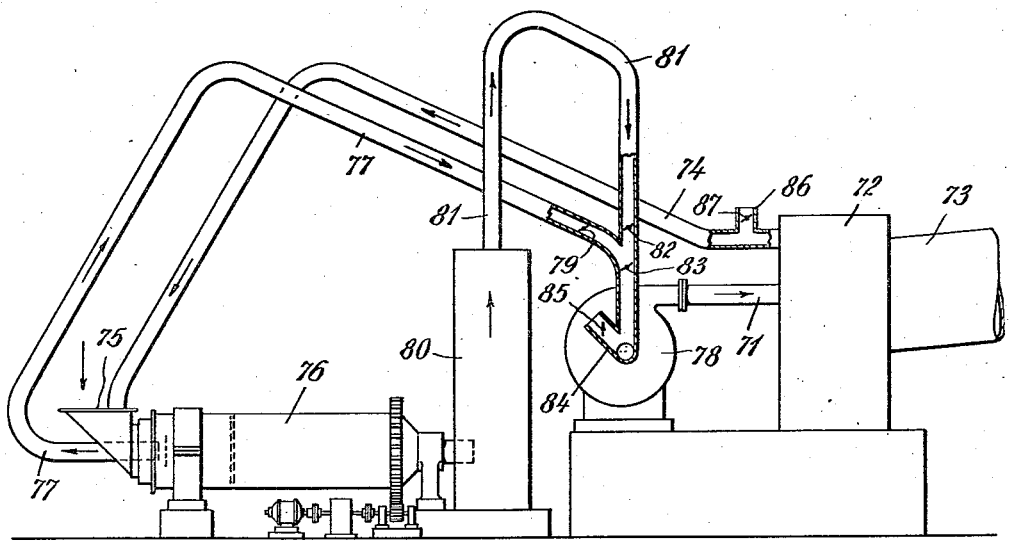

For a better understanding of the invention, reference may be had to the accompanying drawings in which Fig. 1 is a view in side elevation, with parts shown in section, of one system constructed in accordance with the invention;

Fig. 2 is a similar view of a modified system in which the drying and grinding are carried on in separate devices; and Fig. 3 is a view similar to Fig. 1 of a system of the invention in which the fuel-air stream from the mill passes through the fan.

In the drawings, the system of the invention is illustrated in a form suitable for supplying fuel to the burner of a rotary kiln, but it is to be understood that the apparatus in which the fuel is burned is immaterial. Referring to Fig. 1, the system shown includes a burner 10 projecting into the end bottom 11 of a rotary kiln 12, and from the end bottom, a duct 13 leads to the feed hopper 14 of a tube mill 15, subdivided by a partition 16 into a drying compartment 17 and a grinding compartment 18. The mill is supported on bearings 19 and 20 and is provided with a girth gear 21 by which it is rotated by a pinion 22 driven by a motor 23 through a gear box 24. Undried unpulverized fuel is supplied to the feed hopper 14 and enters the drying compartment 17 from which it passes in dried condition to the grinding compartment 18 containing the usual grinding bodies which operate to reduce the material to the desired degree of fineness. Preheated air drawn through the duct 13 enters the drying compartment where it dries the fuel, and a portion of the air then passes through the grinding compartment where it picks up the fine material and then passes out through the hollow trunnion 25 of the mill into the chamber 26 from which a duct 27 leads to a cyclone separator 28. From the air space in the separator, a duct 29 leads to the intake side of a fan 30, flow through the duct being controlled by a valve 31. The pressure side of the fan is connected to the burner 10 and the connection contains a blast nozzle 32, and a duct 33 containing a rotary air seal 34 leads from the bottom of the separator to the burner just beyond the nozzle. The fuel taken from the mill in the air stream flowing through the duct 27 is thus by-passed around the fan and discharged into the air stream delivered by the fan to the burner.

All the preheated air drawn through the duct 13 by the fan enters the drying compartment, but since the amount of air employed for drying is more than that required for sweeping the mill, a portion of the air is withdrawn after it has been used for drying. For this purpose, a duct 35 is mounted to project through the feed hopper and into the drying compartment, the duct having an open end so disposed within the compartment as to permit withdrawal of a portion of the air after it has served for drying and before it passes on into the grinding compartment. The duct 35 leads to the duct 29 at a point ahead of the intake opening of the fan and contains a valve 36 by which the quantity of air which by-passes the grinding compartment can be controlled. Another valve 37 is mounted in the duct 29 between the fan and the point of junction of ducts 29 and 35, the valve 37 permitting control of the total amount of air taken from the combustion chamber. A duct 38, open to the atmosphere, is connected to the intake side of the fan and contains a valve 39, this valve permitting the introduction into the stream passing through the fan of such additional atmospheric air as may be required to provide the desired amount of primary air for combustion purposes. A branch duct 38a, which is open to the atmosphere and contains a valve 38b, leads from the duct 13.

The system illustrated in Fig. 2 includes a burner 40 entering the end bottom 41 of a rotary kiln from which a duct 42 leads to the feed hopper 43 of a drier 44. Fuel is supplied to the feed hopper from a bin 45 and the fuel and preheated air enter the drier through a hollow trunnion 46. The drier is provided with an outlet trunnion 47 and both trunnions are supported in suitable bearings so that the drier can be rotated in the usual way by means of a girth gear 48 and pinion 49. A connecttion 50 leads from the outlet trunnion 47 to the inlet trunnion 51 of a tube mill 52 having an outlet trunnion 53, the trunnions being supported in suitable bearings 54a, 54b and the mill being rotated by a girth gear 55 driven by a pinion 56 rotated by a motor 57 acting through a gear box 58. Duct 59 leads from the connection 50 to the intake side of a fan 60 and flow through the duct is controlled by a valve 61. The fuel-air stream issuing from the outlet trunnion 53 of the mill enters a chamber 62 and thence passes through a duct 63 to a separator 64 from which the air passes to the fan through a duct 65 containing a valve 66. The ducts 59 and 65 join just in front of the intake of the fan and between the junction and the fan is a valve 67. The pressure side of the fan is connected to the burner pipe 40 and the air flowing from the fan to the burner passes through a blast nozzle 68. The fuel issuing from the separator passes through a duct 69 containing a rotary air seal 70 and enters the air stream issuing through the nozzle 68. A duct 61a, which is open to the atmosphere and contains a valve 61b, is connected to the intake side of the fan, and the duct 42 has a branch duct 42a which is open to the atmosphere and contains a valve 42b.

The systems of Figs. 1 and 2 are generally similar, but in the Fig. 1 system, the drying is carried on in a compartment of a tube mill, which is of the construction disclosed in my copending application Serial No. 110,625, filed November 10, 1936, while in the system of Fig. 2, the drier and mill are separate pieces of apparatus. In the operation of both systems, preheated air is drawn from the combustion chamber by the fan and passed through the drying chamber and mill. The full amount of air so withdrawn is used for drying purposes and a portion of the air stream is then diverted and by-passed around the mill while the remainder passes through the mill to carry away the finely divided material. The diverted portion of the air stream flows directly to the fan, while the fuel-laden stream passes to a separator from which the air flows to the fan while the fuel enters the air stream issuing from the fan and flowing to the burner. Additional atmospheric air may be introduced into the stream flowing to the burner if required and the total quantity of preheated air withdrawn from the combustion chamber, the relative proportions of the air used for drying and in the grinding mill, and the amount of atmospheric air introduced may be closely controlled by the valve provided for the purpose.

The system illustrated in Fig. 3 is used for supplying fuel to a burner 71 projecting into the end bottom 74 of a rotary kiln 75 and preheated air is withdrawn from the end bottom through a duct 74 which leads to the feed hopper 75 of a combined drying and grinding mill 76 similar to that illustrated in Fig. 1. A portion of the air used for drying is withdrawn from the drying compartment through a duct 77 which leads to the intake side of a fan 78 and contains a valve 79. The remaining air used for drying passes through the grinding compartment where it picks up finely ground fuel and the fuel-air stream passes through a chamber 80 and thence through a duct 81 leading to the intake side of fan 78. The duct 81 contains a valve 82 and ducts 77 and 81 unite just beyond the valve 82, a valve 83 being provided between the point of union and the intake of the fan. A duct 84, which is open to the atmosphere and contains a valve 85, is also connected to the intake side of the fan and a branch duct 86, which is open to the atmosphere and contains a valve 87, leads from the duct 74.

In the operation of the system shown in Fig. 3, fuel supplied to the feed hopper enters the drying compartment of the mill where it is dried by preheated air, to which some atmospheric air may be added, supplied through duct 74. A portion of the air used for drying then passes on through the mill where it picks up the fuel dust, and the dust-laden stream flows to and through the fan and thence to the burner pipe 71. The remaining portion of the air which has been used for drying is by-passed around the grinding compartment and flows through the duct 77 into the intake side of the fan, where it is combined with the fuel-air stream from the mill. The air in the fuel-air mixture may be augmented, if desired, by atmospheric air entering the fan through the duct 84.

In all three forms of the new system, the drying and grinding equipment is proportioned in capacity to the requirements of the burner so that the equipment operates throughout the period of combustion of the fuel. In the several forms, the relative amounts of air used for the three purposes of drying, sweeping the mill, and primary air for combustion may be closely controlled and the total amount of air may be increased or decreased without variation in the proportions. The new system thus affords close control of the several operations and makes it possible to carry on these operations at high efficiency.

I claim:

1. A system for preparing pulverized fuel and supplying it for combustion in a chamber, which comprises a drying chamber having an inlet for unpulverized fuel, a grinding mill connected to the drying chamber and receiving dried fuel therefrom, a burner delivering a fuel-air mixture into the combustion chamber, a duct connection from the combustion chamber to the drying chamber, a duct connection from the mill to the burner, a fan in the connection from the mill to the burner, the fan drawing air from the combustion chamber through the drying chamber and mill in succession and the air stream entraining pulverized fuel and carrying it away from the mill, a separator in the connection from the mill to the burner delivering separated fuel into the path of air passing from the fan to the burner, and a duct connection from the drying chamber to the intake side of the fan for withdrawing a portion of the air stream which has entered the drying chamber and before it passes on into the mill.

2. A system for preparing pulverized fuel and supplying it for combustion in a chamber, which comprises a drying chamber having an inlet for unpulverized fuel, a grinding mill connected to the drying chamber and receiving dried fuel therefrom, a burner delivering a fuel-air mixture into the combustion chamber, a duct connection from the combustion chamber to the drying chamber, a duct connection from the mill to the burner, a fan in the connection from the mill to the burner, the fan drawing air from the combustion chamber through the drying chamber and mill and the air stream entraining pulverized fuel and carrying it away from the mill, a separator to which the fuel-air stream passes from the mill, the air outlet from the separator being connected to the intake side of the fan and the separator having an outlet connection through which separated fuel passes into the air stream from the outlet side of the fan to the burner, and a duct connection from the drying chamber to the intake side of the fan through which the fan withdraws a portion of the air stream which has entered the drying chamber before it passes on into the mill.

3. A system for preparing pulverized fuel and supplying it for combustion in a chamber, which comprises a drying chamber having an inlet for unpulverized fuel, a grinding mill connected to the drying chamber and receiving dried fuel therefrom, a burner delivering a fuel-air mixture into the combustion chamber, a duct connection from the combustion chamber to the drying chamber, a duct connection from the mill to the burner, a fan in the connection from the mill to the burner, the fan drawing air from the combustion chamber through the drying chamber and mill in succession and the air stream entraining pulverized fuel and carrying it away from the mill, a separator in the connection from the mill to the burner delivering separated fuel into the air stream passing from the pressure side of the fan to the burner, a duct connection leading from a point within the drying chamber to the intake side of the fan for withdrawing part of the air entering the drying chamber and before it passes on into the mill, and means for regulating flow through the connections.

4. A system for preparing pulverized fuel and supplying it for combustion in a chamber, which comprises a drying chamber having an inlet for unpulverized fuel, a grinding mill connected to the drying chamber and receiving dried fuel therefrom, a burner delivering a fuel-air mixture into the combustion chamber, duct connections between the combustion chamber and the drying chamber and also between the discharge end of the mill and the burner, said connections including a fan for causing an air stream to flow through said connections from the combustion chamber through the drying chamber and mill in succession to the burner, a duct connection from the drying chamber to the intake side of the fan for withdrawing a portion of the air entering the drying chamber and before it passes on to the mill, said connection including a duct having an intake end within the drying chamber, and means for regulating flow through the connections.

5. A system for preparing pulverized fuel and supplying it for combustion in a chamber, which comprises a mill having a drying compartment receiving unpulverized fuel and a grinding compartment pulverizing dried fuel received from the drying compartment, a burner delivering a fuel-air mixture into the combustion chamber, duct connections between the combustion chamber and drying compartment and between the grinding compartment and the burner, a fan in the connections for drawing air from the combustion chamber through the drying and grinding compartments in succession, the air stream through the grinding compartment entraining pulverized fuel, a duct connection to the intake side of the fan from the mill for withdrawing a portion of the air entering the drying compartment and before it passes into the grinding compartment, said connection including a duct having an intake end within the drying compartment, and means for controlling flow through the connections.

6. A system for preparing pulverized fuel and supplying it for combustion in a chamber, which comprises a drying chamber having an inlet for unpulverized fuel, a grinding mill, a connection through which dried fuel passes from the drying chamber to the mill, a burner for delivering a fuel-air mixture into the combustion chamber, duct connections between the combustion chamber and the drying chamber and between the mill in succession and the burner, a single fan in one of the connections operating to pass air from the combustion chamber through the drying chamber and mill in direct succession and thence to the burner, the air stream leaving the mill carrying pulverized fuel, a duct leading from the connection between the drying chamber and the mill to the intake side of said single fan for drawing off a portion of the air which has passed through the drying chamber only, and means for controlling flow through the connections.

7. A system for preparing pulverized fuel and supplying it for combustion in a chamber, which comprises a drying chamber having an inlet for undried unpulverized fuel, a grinding mill receiving dried unpulverized fuel from the drying chamber and reducing it to the desired fineness, a burner for delivering a fuel-air mixture into the combustion chamber, a fan, duct connections between the combustion chamber and the drying chamber and between the mill and the burner, the fan acting through the connections to pass air from the combustion chamber through the drying chamber and mill in succession to the burner, the air leaving the mill carrying pulverized fuel with it, a duct connection from the drying chamber to the intake side of the fan through which air which has been used for drying may be taken direct to the fan without passing through the mill, means for regulating the amounts of air flowing through the several connections, and means for introducing additional atmospheric air into the stream flowing to the burner.

8. A system for preparing pulverized fuel and supplying it for combustion in a chamber, which comprises a drying chamber having an inlet for unpulverized fuel, a grinding mill connected to the drying chamber and receiving dried fuel therefrom, a burner delivering a fuel-air mixture into the combustion chamber, a duct connection from the combustion chamber to the drying chamber, a duct connection from the mill to the burner, a single fan in the connection from the mill to the burner, the fan drawing air from the combustion chamber through the drying chamber and mill in direct succession and the air stream entraining pulverized fuel and carrying it away from the mill and through the fan to the burner, a duct connection from the drying chamber to the intake side of the fan for withdrawing a portion of the air stream which has entered the drying chamber and before it passes into the mill, means for admitting additional atmospheric air into the stream flowing to the burner, and means for controlling flow through the connections and the admission of the additional atmospheric air.

9. A system for preparing pulverized fuel and supplying it for combustion in a chamber, which comprises a drying chamber having an inlet for unpulverized fuel, a grinding chamber connected to the drying chamber and receiving dried fuel therefrom, a burner delivering a fuel-air mixture into the combustion chamber, means connecting the combustion chamber and the drying chamber and also connecting the discharge end of the grinding chamber and the burner, said means including a single fan for causing an air stream to circulate through the connecting means from the combustion chamber through the drying chamber and the grinding chamber in direct succession and then from the grinding chamber to the burner, a duct connection from the drying chamber to the intake side of the fan through which the fan withdraws from the air stream a portion of the air which has entered the drying chamber and before the air has passed on into the grinding chamber, and means for controlling circulation between the duct connection and connecting means.

MIKAEL VOGEL-JORGENSEN.